(12) United States Patent
Walthall et al.

(10) Patent No.: US 7,904,229 B2
(45) Date of Patent: Mar. 8, 2011

(54) METHOD FOR DETERMINATION OF ENGINE LUBRICATION OIL CONSUMPTION

(75) Inventors: Rhonda D. Walthall, Escondido, CA (US); Walter E. Ainslie, Ramona, CA (US); Michael E. Mehrer, San Diego, CA (US); William K. Dornfeld, San Diego, CA (US); David R. Adair, Valley Center, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 840 days.

(21) Appl. No.: 11/856,758

(22) Filed: Sep. 18, 2007

(65) Prior Publication Data

US 2009/0076677 A1    Mar. 19, 2009

(51) Int. Cl.
*G06F 19/00*    (2006.01)

(52) U.S. Cl. .................. 701/100; 701/8; 701/10; 701/99; 701/1

(58) Field of Classification Search .................... 701/99, 701/100, 1, 8, 10; 84/6.11, 7.4, 108; 73/112.04
See application file for complete search history.

*Primary Examiner* — Khoi Tran
*Assistant Examiner* — Bhavesh V Amin
(74) *Attorney, Agent, or Firm* — Stephen G. Mican

(57) ABSTRACT

A method of determining lubrication oil consumption in a gas turbine engine that has an engine operating cycle interval comprising a starting phase, a running phase and a shutdown phase, comprises the steps of: measuring lubrication oil level upon initialization of the starting phase of each engine operating cycle interval; comparing the starting phase measured lubrication oil level during the starting phase with a starting phase baseline lubrication measurement; recording the starting phase lubrication oil level measurement; determining average engine lubrication oil consumption rate during the complete engine operating cycle interval by dividing the difference between the starting phase lubrication oil measurement and the baseline lubrication oil measurement; and repeating these steps for each subsequent engine operating cycle interval; wherein the starting phase baseline lubrication oil level measurement is initially a predetermined lubrication oil level and then the previous starting phase lubrication oil measurement for subsequent engine operating cycle intervals.

24 Claims, 3 Drawing Sheets

METHOD FOR DETERMINATION OF ENGINE LUBRICATION OIL CONSUMPTION

FIELD OF THE INVENTION

The invention relates to a method for determining consumption of lubrication oil in a lubrication system for an engine, and more particularly to a method for determining gas turbine engine lubrication oil consumption.

BACKGROUND OF THE INVENTION

Historically, methods for determining consumption of lubrication oil in a lubrication system for a gas turbine engine have been inaccurate due to the lack of automatic sensors and real-time monitoring. These methods have relied on manually-entered records of the amount of lubrication oil added, and these typically have comprised approximations. In addition, the hours of engine operation have been estimates based on aircraft utilisation. Therefore, the methods used to determine engine lubrication oil consumption have generally been based on approximate quantities of oil added and approximate hours of engine operation.

The inaccurate determination of oil consumption has contributed to early APU removals due to High Oil Consumption. Frequently, these APUs were returned to Repair Stations, where expensive repairs were performed, which could have been deferred to a later date had the High Oil Consumption condition not existed.

With the introduction of lubrication oil level sensors that accurately indicate engine lubrication oil quantity in real time and the ability to track actual engine operating hours, it is possible to more accurately determine engine lubrication oil consumption. Furthermore, the ability to communicate engine lubrication oil quantity and engine operating hours in real time to an engine data acquisition system for automatic retrieval can enable a prognostic and diagnostic health management system to monitor such lubrication oil consumption.

SUMMARY OF THE INVENTION

The invention generally comprises a method of determining lubrication oil consumption in a gas turbine engine that has an engine operating cycle interval comprising a starting phase, a running phase and a shutdown phase, comprising the steps of: measuring lubrication oil level upon initialisation of the starting phase of each engine operating cycle interval; comparing the starting phase measured lubrication oil level during the starting phase with a starting phase baseline lubrication measurement; recording the starting phase lubrication oil level measurement; determining average engine lubrication oil consumption rate during the complete engine operating cycle interval by dividing the difference between the starting phase lubrication oil measurement and the baseline lubrication oil measurement; and repeating these steps for each subsequent engine operating cycle interval; wherein the starting phase baseline lubrication oil level measurement is initially a predetermined lubrication oil level and then the previous starting phase lubrication oil measurement for subsequent engine operating cycle intervals.

DETAILED DESCRIPTION OF THE INVENTION

Figure 1:
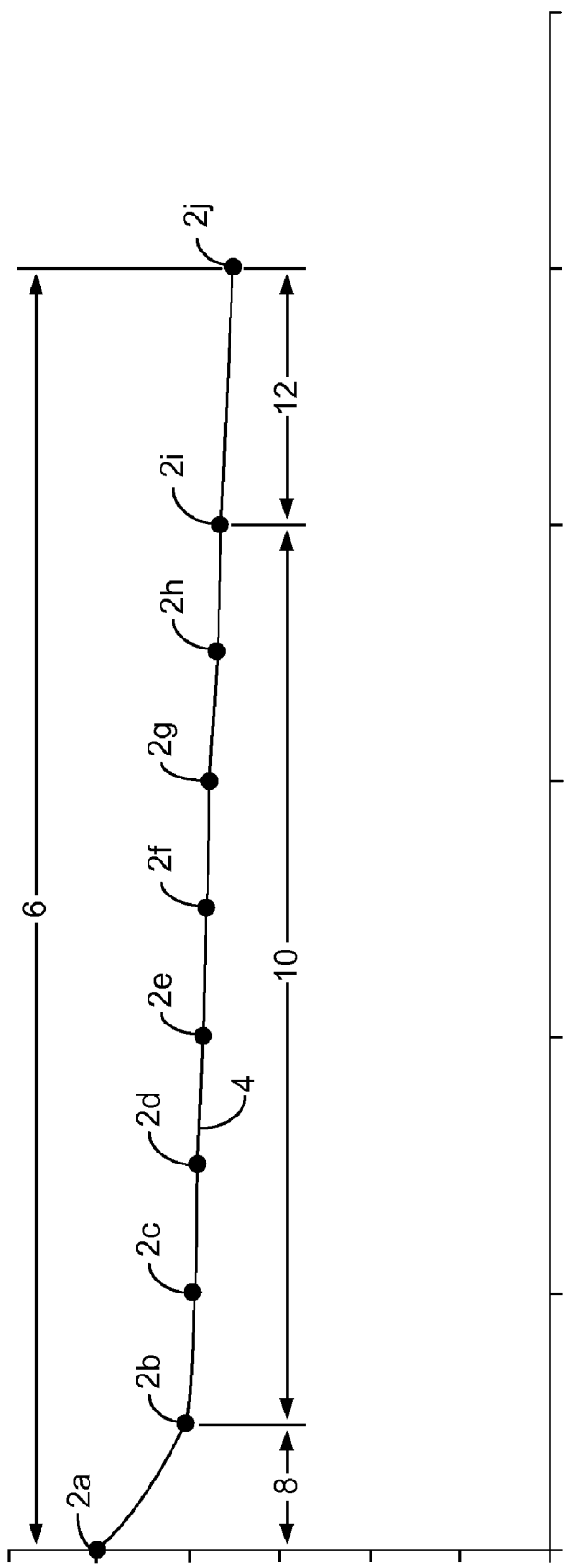
FIG. 1 is a graphical representation of lubrication oil level as a function of time for a typical gas turbine engine over a complete operating cycle divided into several windows of the operating cycle according to a possible embodiment of the invention.

From the moment of initialising a start sequence to cool-down after shutdown, a gas turbine engine has a lubrication oil level that varies as a function of time. FIG. 1 is a graphical representation of lubrication oil level as a function of time for a typical gas turbine engine over a complete operating cycle divided into several windows of the operating cycle according to a possible embodiment of the invention. Determining changes in such lubrication oil level over time may then allow determination of lubrication oil consumption by the engine. Data points 2a to 2i represent measurements of lubrication oil level for the engine at predetermined intervals during a complete operating cycle of the engine from an initialisation of engine start, represented by data point 2a, to an engine shutdown request under load before cool-down, represented by point 2i. Data point 2j represents a measurement of lubrication oil level for the engine shutdown without load after cool-down. Line 4 represents a lubrication oil consumption curve for the engine over a complete engine operating cycle interval 6 that follows the data points 2.

The lubrication oil level varies during each complete engine operating cycle interval 6 and it tends to have discrete shifts between different phases, or windows, of each engine operating cycle interval 6. For instance, in FIG. 1 an interval extending from data point 2a, representing initialisation of engine start, to data point 2b, representing an engine ready-to-load run state, corresponds to a first window 8 that designates a starting phase of the engine operating cycle interval 6. Due to the nature of the starting process for a gas turbine engine, the highest change in measured lubrication oil level tends to occur in this first window 8. An interval extending from data point 2b to data point 2i, representing engine shutdown under load before cool-down, corresponds to a second window 10 that designates a running phase of the operating cycle interval 6 during which a more gradual rate of lubrication oil consumption tends to occur. An interval extending from data point 2i to data point 2j, representing engine shutdown without load after cool-down, corresponds to a third window 12 that designates a shutdown phase of the operating cycle interval 6 during which a small rate of lubrication oil level occurs primarily due to the cooling process.

It is apparent that lubrication oil level change during the starting phase within the first window 8 has a most important impact on overall lubrication oil level change during the operating cycle interval 6 and measuring and comparing lubrication oil level at data point 2a between consecutive operating cycle intervals 6 therefore may provide the best gage of average lubrication oil consumption between the operating cycle intervals 6. At the same time, the relatively high lubrication oil change during the first window 8 may tend to mask the rate and quantity of lubrication oil consumption during the running phase within the second window 10 of each operating cycle interval 6. In other words, any increase in rate and quantity of lubrication oil consumption during the running phase within the second window 10 is generally difficult to ascertain by simply measuring and comparing lubrication oil level at data point 2a between consecutive operating cycle intervals 6 due to the change in lubrication oil level during the starting phase within the first window 8.

Therefore, it is desirable to measure the difference in lubrication oil level for data point 2b and data point 2i, at the beginning and end of the running phase within the second window 10, and divide it by the engine running time during this interval to ascertain the rate of lubrication oil consumption, and then to compare it to the rate of lubrication oil consumption for the second window 10 of the previous operating cycle interval 6. It is also desirable to measure lubrication oil level between data point 2i and 2j, at the beginning and end of the shutdown phase within the third window 12, and preferably at the data point 2j, and then to compare it to a measured lubrication oil level at the same data point 2 for the previous operating cycle interval 6 to provide another gage of average lubrication oil consumption between the operating cycle intervals 6.

By using this procedure applied to the consecutive engine operating cycle intervals 6, it is possible to measure, monitor and analyse lubrication oil consumption in real time over each complete engine operating cycle interval 6 whilst compensating for changes in rate of lubrication oil consumption over each complete engine operating cycle interval 6. According to a possible embodiment of the invention, the first step of this process comprises measuring lubrication oil level upon initialisation of the first window 8 that corresponds to data point 2a. The second step compares the measured lubrication oil level at data point 2a to the measured lubrication oil level upon initialisation of the first window 8 that corresponds to data point 2a of a previous engine operating cycle interval 6. The third step indicates any change in lubrication oil level for the data points 2a during the adjacent engine operating cycle intervals 6. This step may comprise indicating no change or a measured increase in lubrication oil level as an addition of lubrication oil to the engine, such as with a flag that indicates oil added. This step may also comprise recording the lubrication oil level that corresponds to data point 2a. The fourth step determines the average oil consumption rate during the complete operating cycle interval 6 by dividing the difference in the lubrication oil level indicated by data point 2a in the first window 8 from the lubrication oil level indicated by the data point 2a in the first window 8 of the previous operating cycle 6 by the engine running time between them. The first through the fourth steps thus track lubrication oil consumption and rate of lubrication consumption for each engine operating cycle interval 6, as well as indicating added lubrication oil between each engine operating cycle interval 6, using lubrication oil level data points 2 within the first window 8 that designates the starting phase of the engine.

The fifth step determines the difference in lubrication oil level between the beginning and end of the running phase corresponding to data points 2b and 2i within the second window 10. This step may comprise indicating no change or a measured increase in lubrication oil to the engine, such as with a flag that indicates a lubrication oil measurement or level sensor error. This step may also comprise determining the rate of lubrication oil consumption during the running phase of the engine by dividing the difference in lubrication oil level by the engine running time between data points 2b and 2i within the second window 10. The sixth step may further comprise recording the determined rate of lubrication oil consumption for each second window 10 of each engine operating cycle interval 6. The fifth and sixth steps thus determine the rate of lubrication oil consumption during the running phase of the engine designated by the second window 10 of each engine operating cycle interval 6, as well as recording the determined rate of running phase lubrication oil consumption and indicating any lubrication oil measurement or level sensor error.

The seventh step comprises measuring the lubrication oil level within the shutdown phase of the engine operating cycle interval 6 within the third window 12. Preferably this measurement occurs at the data point 2j that represents engine shutdown without load after cool-down, but alternatively it may comprise any data point 2 within the third window 12. The eighth step compares the measured lubrication oil level a corresponding data point 2, such as data point 2j, within the third window 12 of a previous engine operating cycle interval 6. This step may also comprise recording the lubrication oil level that corresponds to the selected data point 2, such as data point 2j. The ninth step determines the average oil consumption rate during the complete operating cycle interval 6 by dividing the difference in the lubrication oil level indicated by selected data point 2, such as data point 2j, in the third window 12 from the lubrication oil level indicated by the selected data point 2, such as data point 2j, in the first window 8 of the previous operating cycle 6 by the engine running time between them. The seventh through the ninth steps thus track lubrication oil consumption and rate of lubrication consumption for each engine operating cycle interval 6, as well as indicating added lubrication oil between each engine operating cycle interval 6, using lubrication oil level data points 2 within the third window 12 that designates the shutdown phase of the engine.

Figure 2:
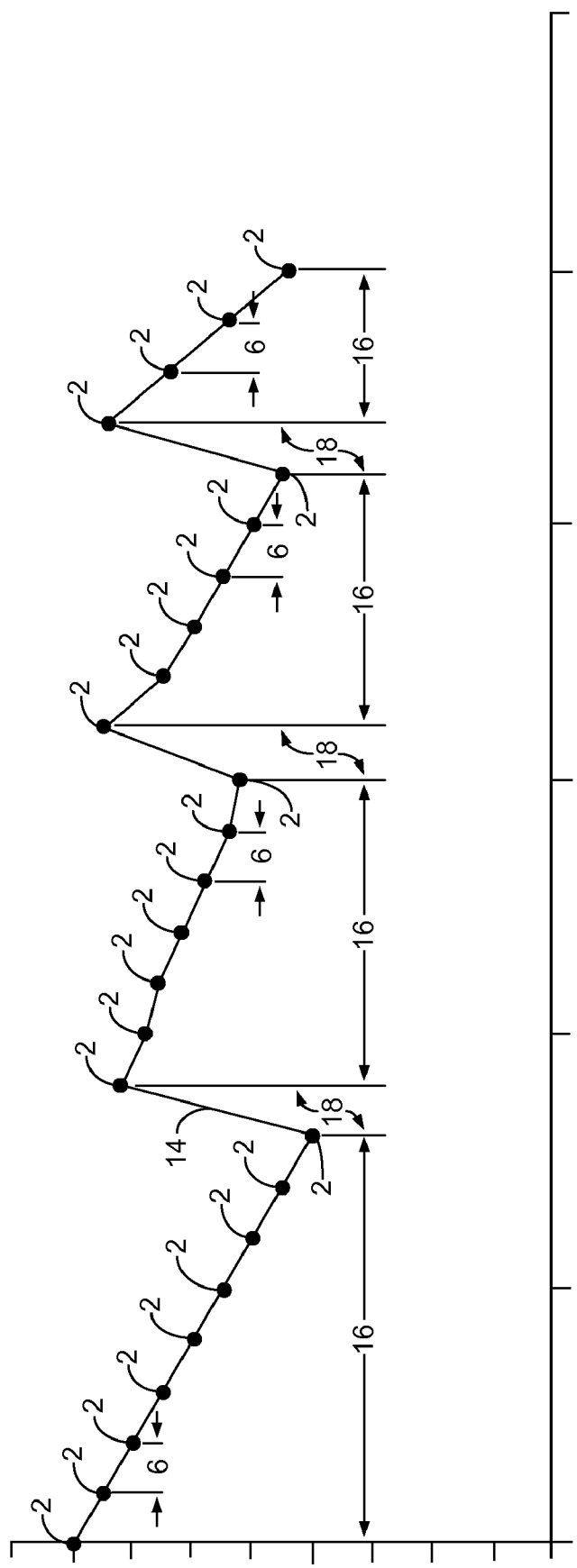
FIG. 2 is a graphical representation of lubrication oil level for a typical gas turbine engine over a large number of operating cycles that indicates lubrication oil level and rate of lubrication oil consumption as a function of time.

FIG. 2 is a graphical representation of recorded data points 2 representing lubrication oil levels for a large number of engine operating cycles intervals 6 that may indicate lubrication oil consumption and rate of lubrication oil consumption of a typical gas turbine as a function of time. These may be data points 2a from the first window 8 of each engine operating cycle interval 6 or they may be data points 2 within the third window 12, such as data points 2j, of each engine operating cycle interval 6. Line 14 represents a lubrication oil consumption curve for the engine. Line 14 typically has a "saw tooth" shaped curve, wherein each downward slope region 16 represents the rate of lubrication oil consumption and each upward slope region 18 represents addition of lubrication oil to the engine.

It is desirable to establish a "baseline" rate of lubrication oil consumption for the engine prior to entry into service. This baseline rate of lubrication oil consumption may serve as a starting point for implementing the lubrication oil consumption measuring process in the first window 8, the second window 10 and the third window 12 of the each engine operating cycle interval 6 as hereinbefore described. It is also desirable to generate a lubrication oil consumption rate alert if the measured lubrication oil consumption rate exceeds a predetermined deviation from the baseline rate.

Figure 3:
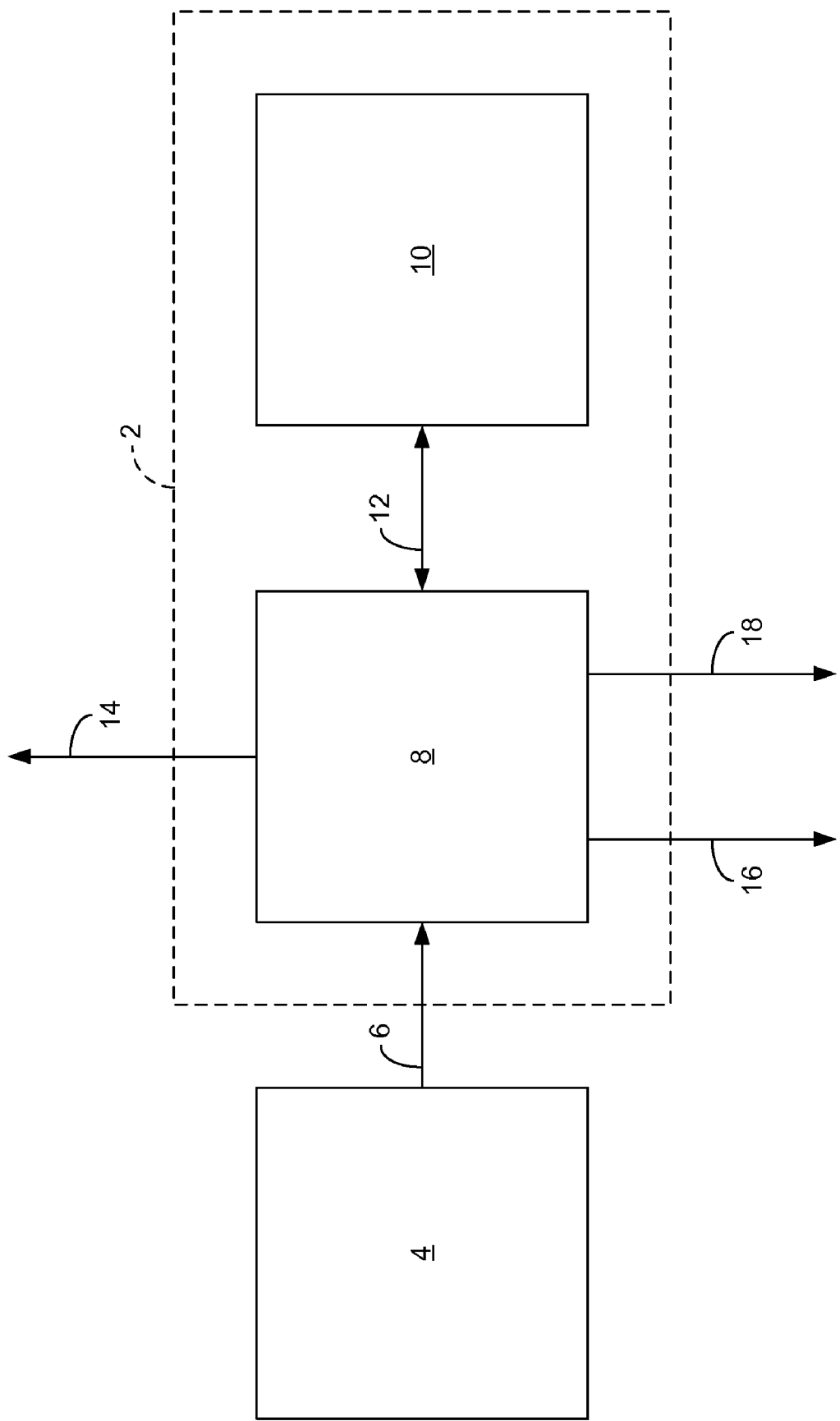
FIG. 3 is a high-level schematic diagram of a data processing system for implementing a method of determining lubrication oil consumption in a gas turbine engine according to a possible embodiment of the invention.

FIG. 3 is a high-level schematic diagram of a data processing system 2 for implementing the hereinbefore described method of determining lubrication oil consumption in a gas turbine engine. A lubrication oil level sensor 4 coupled to a gas turbine engine (not shown) transmits a lubrication oil level signal that is representative of oil level in the engine to the data processing system 2 by way of a sensor output line 6. The data processing system 2 may comprise a central processing unit (CPU) 8 coupled to a memory unit 10 by way of a two-way data bus 12. The memory unit 10 may comprise any sort of computer or CPU-readable media for storing instructions for carrying out the hereinbefore described method of determining lubrication oil consumption in the engine, such as read-only memory (ROM), random-access memory (RAM), electrically erasable programmable read-only memory (EEPROM), flash memory, optical media such as any sort of optical data storage disc or magnetic media such as any sort of magnetic storage disc. Alternatively, the data processing system 2 may comprise an application-specific integrated circuit (ASIC) that comprises such CPU 8 and memory unit 10 functionality.

Implementing instructions stored in the memory unit 10, the CPU 8 executes the hereinbefore described method of determining lubrication oil consumption in the engine in response to the lubrication oil level signal on the sensor output line 6, causing the data processing system 2 to generate an average lubrication oil consumption rate signal on a system output line 14. The data processing system 2 may also generate a starting phase lubrication oil consumption rate alert on a starting phase alert line 16. The data processing system 2 may also generate a running phase lubrication oil consumption rate alert on a running phase alert line 18.

The described embodiments of the invention are only some illustrative implementations of the invention wherein changes and substitutions of the various parts and arrangement thereof are within the scope of the invention as set forth in the attached claims.

The claimed invention is:

1. A method of determining lubrication oil consumption in a gas turbine engine that has an engine operating cycle interval comprising a starting phase, a running phase and a shutdown phase, comprising the steps of:
   measuring lubrication oil level upon initialisation of the starting phase of each engine operating cycle interval;
   comparing the starting phase measured lubrication oil level during the starting phase with a starting phase baseline lubrication measurement;
   recording the starting phase lubrication oil level measurement;
   determining average engine lubrication oil consumption rate during the complete engine operating cycle interval by dividing the difference between the starting phase lubrication oil measurement and the baseline lubrication oil measurement; and
   repeating these steps for each subsequent engine operating cycle interval;
   wherein the starting phase baseline lubrication oil level measurement is initially a predetermined lubrication oil level and then the previous starting phase lubrication oil measurement for subsequent engine operating cycle intervals.

2. The method of claim 1, further comprising the step of indicating no change or a measured increase in lubrication oil level as an addition of lubrication oil to the engine.

3. The method of claim 2, further comprising the step of generating a starting phase lubrication oil consumption rate alert if the determined starting phase lubrication oil consumption rate exceeds a predetermined deviation from the initial starting phase baseline rate.

4. The method of claim 1, further comprising the steps of:
   measuring lubrication oil levels at the beginning and end of the running phase of each engine operating cycle interval;
   determining the difference in lubrication oil level between the measured lubrication oil levels at the beginning and end of the running phase;
   determining the rate of lubrication oil consumption during the running phase by dividing the determined difference in lubrication oil level by the engine running time between the beginning and end of the running phase;
   recording the determined rate of lubrication oil consumption during the running phase; and
   repeating these steps for each subsequent engine operating cycle interval.

5. The method of claim 4, further comprising the step of generating a running phase lubrication oil consumption rate alert if the determined running phase lubrication oil consumption rate exceeds a predetermined deviation from a predetermined running phase baseline lubrication oil consumption rate.

6. The method of claim 1, further comprising the steps of:
   measuring lubrication oil level during a selected point in the shutdown phase of each engine operating cycle interval;
   comparing the measured shutdown phase lubrication oil level with a baseline shutdown phase lubrication oil level measurement;
   recording the measured shutdown phase lubrication oil level;
   determining average engine lubrication oil consumption rate during the complete engine operating cycle interval by dividing the difference between the shutdown phase lubrication oil measurement and the baseline lubrication oil measurement; and
   repeating these steps for each subsequent engine operating cycle interval;
   wherein the shutdown phase baseline lubrication oil level measurement is initially a predetermined lubrication oil level and then the previous shutdown phase lubrication oil measurement for subsequent engine operating cycle intervals.

7. The method of claim 6, wherein the selected point in the shutdown phase of each engine operating cycle interval is at the end of the shutdown phase of each engine operating cycle interval.

8. The method of claim 6, further comprising the step of generating a running phase lubrication oil consumption rate alert if the determined shutdown phase lubrication oil consumption rate exceeds a predetermined deviation from the initial shutdown phase baseline lubrication oil consumption rate.

9. A method of determining lubrication oil consumption in a gas turbine engine that has an engine operating cycle interval comprising a starting phase, a running phase and a shutdown phase, comprising the steps of:
   measuring lubrication oil levels at the beginning and end of the running phase of each engine operating cycle interval;
   determining the difference in lubrication oil level between the measured lubrication oil levels at the beginning and end of the running phase;
   determining the rate of lubrication oil consumption during the running phase by dividing the determined difference in lubrication oil level by the engine running time between the beginning and end of the running phase;
   recording the determined rate of lubrication oil consumption during the running phase; and
   repeating these steps for each subsequent engine operating cycle interval.

10. The method of claim 9, further comprising the step of generating a running phase lubrication oil consumption rate alert if the determined running phase lubrication oil consumption rate exceeds a predetermined deviation from a predetermined running phase baseline lubrication oil consumption rate.

11. The method of claim 9, further comprising the steps of:
measuring lubrication oil level during a selected point in the shutdown phase of each engine operating cycle interval;
comparing the measured shutdown phase lubrication oil level with a baseline shutdown phase lubrication oil level measurement;
recording the measured shutdown phase lubrication oil level;
determining average engine lubrication oil consumption rate during the complete engine operating cycle interval by dividing the difference between the shutdown phase lubrication oil measurement and the baseline lubrication oil measurement; and
repeating these steps for each subsequent engine operating cycle interval;
wherein the shutdown phase baseline lubrication oil level measurement is initially a predetermined lubrication oil level and then the previous shutdown phase lubrication oil measurement for subsequent engine operating cycle intervals.

12. The method of claim 10, wherein the selected point in the shutdown phase of each engine operating cycle interval is at the end of the shutdown phase of each engine operating cycle interval.

13. The method of claim 10, further comprising the step of generating a running phase lubrication oil consumption rate alert if the determined shutdown phase lubrication oil consumption rate exceeds a predetermined deviation from the initial shutdown phase baseline lubrication oil consumption rate.

14. A method of determining lubrication oil consumption in a gas turbine engine that has an engine operating cycle interval comprising a starting phase, a running phase and a shutdown phase, comprising the steps of:
measuring lubrication oil level during a selected point in the shutdown phase of each engine operating cycle interval;
comparing the measured shutdown phase lubrication oil level with a baseline shutdown phase lubrication oil level measurement;
recording the measured shutdown phase lubrication oil level;
determining average engine lubrication oil consumption rate during the complete engine operating cycle interval by dividing the difference between the shutdown phase lubrication oil measurement and the baseline lubrication oil measurement; and
repeating these steps for each subsequent engine operating cycle interval;
wherein the shutdown phase baseline lubrication oil level measurement is initially a predetermined lubrication oil level and then the previous shutdown phase lubrication oil measurement for subsequent engine operating cycle intervals.

15. The method of claim 14, wherein the selected point in the shutdown phase of each engine operating cycle interval is at the end of the shutdown phase of each engine operating cycle interval.

16. The method of claim 14, further comprising the step of generating a running phase lubrication oil consumption rate alert if the determined shutdown phase lubrication oil consumption rate exceeds a predetermined deviation from the initial shutdown phase baseline lubrication oil consumption rate.

17. Computer-readable media for storing instructions to determine lubrication oil consumption in a gas turbine engine that has an engine operating cycle interval comprising a starting phase, a running phase and a shutdown phase, comprising:
instructions to measure lubrication oil level upon initialisation of the starting phase of each engine operating cycle interval;
instructions to measure the starting phase measured lubrication oil level during the starting phase with a starting phase baseline lubrication measurement;
instructions to record the starting phase lubrication oil level measurement;
instructions to determine average engine lubrication oil consumption rate during the complete engine operating cycle interval by dividing the difference between the starting phase lubrication oil measurement and the baseline lubrication oil measurement; and instructions to repeat these instructions for each subsequent engine operating cycle interval;
wherein the starting phase baseline lubrication oil level measurement is initially a predetermined lubrication oil level and then the previous starting phase lubrication oil measurement for subsequent engine operating cycle intervals.

18. The computer-readable media of claim 17, further comprising instructions to indicate no change or a measured increase in lubrication oil level as an addition of lubrication oil to the engine.

19. The computer-readable media of claim 18, further comprising instructions to generate a starting phase lubrication oil consumption rate alert if the determined starting phase lubrication oil consumption rate exceeds a predetermined deviation from the initial starting phase baseline rate.

20. The computer-readable media of claim 17, further comprising:
instructions to measure lubrication oil levels at the beginning and end of the running phase of each engine operating cycle interval;
instructions to determine the difference in lubrication oil level between the measured lubrication oil levels at the beginning and end of the running phase;
instructions to determine the rate of lubrication oil consumption during the running phase by dividing the determined difference in lubrication oil level by the engine running time between the beginning and end of the running phase;
instructions to record the determined rate of lubrication oil consumption during the running phase; and
instructions to repeat these instructions for each subsequent engine operating cycle interval.

21. The computer-readable media of claim 20, further comprising instructions to generate a running phase lubrication oil consumption rate alert if the determined running phase lubrication oil consumption rate exceeds a predetermined deviation from a predetermined running phase baseline lubrication oil consumption rate.

22. The method of claim 17, further comprising:
instructions to measure lubrication oil level during a selected point in the shutdown phase of each engine operating cycle interval;
instructions to compare the measured shutdown phase lubrication oil level with a baseline shutdown phase lubrication oil level measurement;
instructions to record the measured shutdown phase lubrication oil level;
instructions to determine average engine lubrication oil consumption rate during the complete engine operating cycle interval by dividing the difference between the shutdown phase lubrication oil measurement and the baseline lubrication oil measurement; and instructions to repeat these instructions for each subsequent engine operating cycle interval;

wherein the shutdown phase baseline lubrication oil level measurement is initially a predetermined lubrication oil level and then the previous shutdown phase lubrication oil measurement for subsequent engine operating cycle intervals.

23. The computer-readable media of claim 22, wherein the selected point in the shutdown phase of each engine operating cycle interval is at the end of the shutdown phase of each engine operating cycle interval.

24. The computer-readable media of claim 22, further comprising instructions to generate a running phase lubrication oil consumption rate alert if the determined shutdown phase lubrication oil consumption rate exceeds a predetermined deviation from the initial shutdown phase baseline lubrication oil consumption rate.

* * * * *